Feb. 16, 1960

B. W. OSWALT 2,924,945

ADJUSTING MECHANISM FOR HYDRAULIC MOTORS

Filed March 10, 1958

INVENTOR.
BURLIN W. OSWALT
BY
John D. Haney
ATTY.

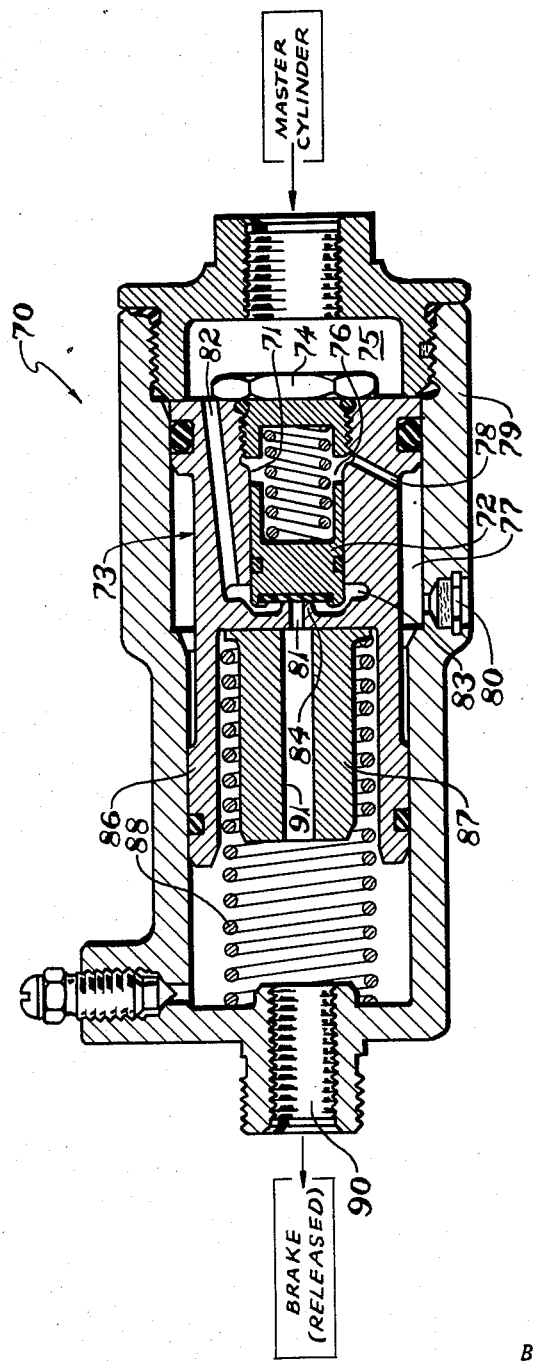

United States Patent Office 2,924,945
Patented Feb. 16, 1960

2,924,945
ADJUSTING MECHANISM FOR HYDRAULIC MOTORS

Burlin W. Oswalt, Union, Ohio, assignor to The B. F. Goodrich Company, New York, N.Y., a corporation of New York Application March 10, 1958, Serial No. 720,192

4 Claims. (Cl. 60—54.5)

This invention relates to mechanisms for automatically adjusting hydraulic brakes to maintain a uniform release clearance between the engageable braking members and hence provide a uniform pedal action for a braking system. The mechanism of this invention is a two-way hydraulic adjuster, in that it is adapted to compensate both for wear and for expansion or deflection of the braking members. In addition to this adjusting function, the present mechanism in a brake system operates, when the brake is disengaged, to isolate the brake motor from a static or "back" pressure of the hydraulic system supplying fluid for operating the brake.

Since this adjusting mechanism is adapted for isolating the brake motor from the back pressure of the fluid supply system, the mechanism advantageously provides for improved braking action in that it makes it feasible to design brake mechanisms with retracting springs of moderate size and stiffness for high pressure hydraulic systems. Ordinarily, the retractor springs of a brake mechanism not only separate the engageable braking members when the brake released, but also they hold the brake members disengaged against the static or back pressure of the hydraulic supply system for operating the brake. In high energy aircraft brakes the retractor springs usually undergo substantial deflection when the brakes are engaged, and, moreover, there is usually substantial back pressure in the hydraulic supply system which the springs must oppose when released. Accordingly, prior to this invention, such aircraft brakes have normally embodied very stiff, bulky retractor spring units to achieve the braking action required. The mechanism of the present invention relieves the brake itself of the burden of opposing the system back pressure so that smaller, more flexible spring units may be used successfully, resulting in a freer brake action.

Insofar as its general adjusting function is concerned, the mechanism of this invention incorporates principles and features claimed in my copending application, Serial No. 459,374 filed September 30, 1954, now Patent 2,835,-111. In addition, it includes certain new and improved features which enhance the efficiency and sensitivity of the adjusting function. One such feature is the use of differential hydraulic areas on the opposing sides of the main servo piston of the mechanism to provide for displacement of the piston during the resetting motion to reset the release clearance. Another improved feature is arrangement by which any failure of the dynamic liquid seals inside the mechanism can be detected visually, externally of the mechanism. Still another feature is a construction in which the piston valve which regulates flow from the brake system into the line or "fluid link" supplying the brake is located in a chamber vented to atmosphere so that there is no possibility of hydraulic fluid interfering with the action of this valve.

The invention will be further described with reference to the accompanying drawings in which two representative embodiments of the improved mechanism of this invention are shown. In the drawings:

Fig. 3 is an axial cross-sectional view of another preferred form of adjusting mechanism, the view showing the condition of the mechanism when the brake is disengaged.

Figure 1:
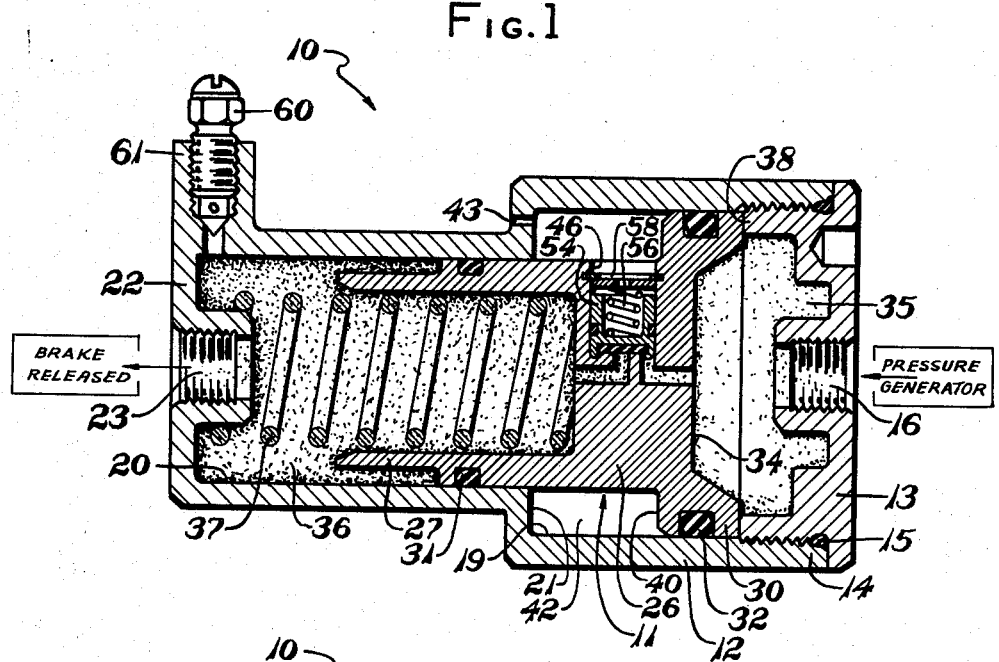
Fig. 1 is an axial cross-sectional view of an improved adjusting mechanism together with a brake system which is represented schematically, the adjusting mechanism being shown in its condition when the brake is disengaged.
Figure 2:
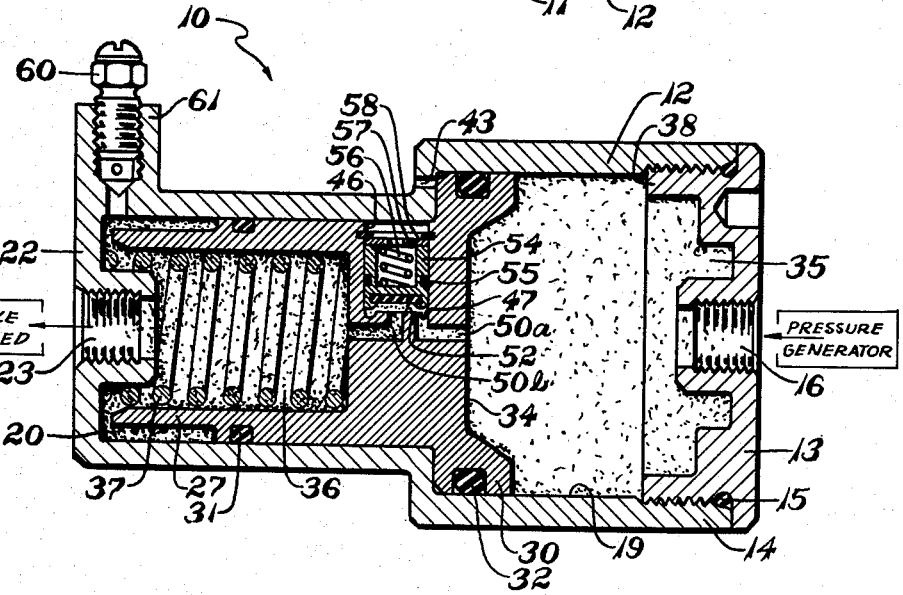
Fig. 2 is a view similar to Fig. 1 but showing the condition of the adjusting mechanism when the brake is engaged.

Referring to Figs. 1–2 of the drawings, the adjuster mechanism 10 there shown is connected in series hydraulically with a brake motor and a fluid pressure generator, both represented schematically. The major components of the adjuster mechanism 10 include a servo piston assembly 11 positioned inside a cup-shaped casing 12, the open end of which is closed by an end cap 13. The end cap 13 in this construction is threaded into the rim 14 of the casing and sealed against a gasket 15 at the rim. End cap 13 further includes an inlet opening 16 through which actuating fluid is admitted into the casing from the pressure generator.

The casing 12 is formed with a wide internal axial bore 19 near the inlet end of the casing which bore merges with a smaller internal axial bore 20 at an annular shoulder 21 at the medial portion of the casing. The smaller bore 20 extends to a bottom wall 22 of the casing through which there is an outlet opening 23 communicating with suitable piping (not shown) leading to the brake motor.

The servo piston assembly 10 includes a rigid piston 26 having a tubular projection 27 fitting slidably into the small bore 20 of the casing and further includes a radial flange portion 30, the periphery of which slidably fits the large bore 19 of the casing. The tubular projection 27 and the radial flange 30 are sealed in slidable engagement with their respective bores by the external peripheral O-rings 31 and 32, respectively. The radial face 34 of the flanged end of piston 26 defines with the end cap 13 and the intervening portion of the large bore 19 and inlet chamber 35 for the mechanism. This chamber 35 is normally filled with hydraulic actuating fluid and is directly connected to the pressure generator of the brake system. The fluid in the inlet chamber 35 acts against an effective hydraulic area at the flanged end of piston 26 equivalent to the transaxial area of the large bore 19. Adjacent outlet 23 at the opposite end of the casing the small bore 20 of the casing together with the portions of the piston 26 leftward of O-ring 31 define an outlet chamber 36 for the mechanism. This chamber together with the hydraulic fluid filling the brake line and leading to the brake motor is hereinafter called the "fluid link" of the mechanism.

In Figs. 1 and 2 the densely stippled areas inside the casing to the left of piston 26 represent the fluid link whereas the sparsely stippled areas toward the right represent the regions filled with actuating fluid or the so-called inlet fluid of the mechanism.

The servo piston assembly 11 is arranged for axial displacement in the casing against the opposition of a mainspring 37 from a released or non-actuated position of the piston assembly as in Fig. 1 (in which radial flange 30 abuts an annular shoulder 38 on the interior of end cap) to its actuated or operating position as in Fig. 2. In the non-actuating position of the piston assembly 11 (Fig. 1) the piston assembly is biased by spring 37 against the annular shoulder 38 and resists the particular static or "back" pressure, if any, maintained in the inlet fluid by the pressure generator. In certain aircraft systems, for example, such back pressure may be in the order of 15 to 20 pounds per square inch gauge pressure. The spring 37 has one end seated against the bottom wall 22 of the casing and its other end extends inside the tubular projection 27 so that the spring is maintained under direct compression between the bottom of the casing and the piston 26.

In the retracted condition of the piston assembly 11 the forward radial face 40 on radial flange 30 of piston 26, and the adjoining surfaces of the piston together with the large bore 19 and the shoulder 21 of the casing cooperatively define an annular chamber 42 which is empty and which has a vent 43 through shoulder 21 to the external surrounding atmosphere.

Opening radially into the body of the piston 26 adjacent flange 30 is a cylindrical chamber 46 (see reference numbers on Fig. 2). At the bottom of the chamber 46 there is an annular groove 47 which in turn is connected through a port 50–A to the inlet chamber 35. Opening into the bottom center of this chamber 46 is another port 50–B which leads through the piston 26 to the outlet chamber 36. At the mouth of port 50–B inside the cylinder 46 there is a plane annular valve seat 52 to receive a rubber covered face of the piston valve 54 which is mounted slidably in cylinder 46 and is sealed therein by an encircling O-ring 55. The piston valve 54 is normally biased toward a closed position on the valve seat 52 by a valve spring 56 which fits inside the open end of the piston valve 54 and is maintained under compression between the valve and the annular ring 57 locked in place by a snap ring 58. The seal 55 about piston 54 prevents leakage by the piston toward the snap ring, but since the annular chamber 42 is vented to the atmosphere, any fluid leaking by piston 54 is forced out of casing 12 through the vent 43 and cannot impede the reciprocation of the piston valve 54.

The central region of the rubber face of the piston valve 54 covers and closes the port 50–B and is adapted to sealingly engage valve seat 52. The annular marginal area of this piston valve opposite groove 47 serves as the hydraulic actuating service for the piston valve. The groove 47 is normally full of fluid from the inlet chamber 35 through port 50–A, and the valve spring 56 is of sufficient strength to maintain the piston valve 54 closed against the system back pressure when the mechanism is in the released condition.

When the mechanism is in released condition, the main spring 37 provides a force adequate to resist the system back pressure. The fluid link, however, will be under a comparatively slight pressure established by the retractor springs (not shown) of the brake unit and this pressure of the fluid link acts on the center region of the face of piston valve 54 through port 50–B. Valve spring 56 is also of sufficient stiffness to keep the piston valve 54 closed against the fluid link pressure to maintain the fluid link isolated from the actuating fluid in chamber 35. As hereinafter explained in connection with the operation of the mechanism, the piston valve 54 is operable in response to a predetermined pressure in either the inlet fluid or the outlet fluid in chambers 35 or 36, respectively, to open port 50–B and thereby connect the outlet chamber 36 with the inlet chamber 35 through ports 50–A and 50–B in the piston.

When the brake system is pressurized by the pressure generator, the piston assembly 11 is moved translationally leftward against the spring 37 to displace the fluid link from chamber 36 through the outlet opening 23 and into the brake to operate the brake motor. The adjusting mechanism is preferably designed so that the volume of fluid displaced from its outlet chamber 36 in order to "bottom" piston 26 in casing 12 is substantially equal to the volume of fluid required to operate the brake motor to engage the brake when there is a predetermined clearance between the engageable braking members. Thus if the braking members are separated at their uniform or standard clearance when the brake system is pressurized, the piston assembly 11 will bottom as in Fig. 2 at substantially the same time the engageable brake members are firmly pressed together in the brake. As soon as, or close to the time the piston assembly 11 bottoms in the casing, the pressure of the inlet hydraulic fluid in chamber 35 will reach the full rated pressure of the pressure generator. Then the full system pressure is transmitted through passage 50–A and groove 47 to act against the annular marginal surface of valve 54 and thus overcome the valve spring 56 and open the valve. Ordinarily there will be little or no flow of inlet fluid across the valve seat 52 from passage 50–A to passage 50–B immediately upon opening of valve 54 because the pressure in the fluid link will at that time substantially equal the pressure in the inlet chamber of the mechanism. Throughout a period in which the brake is engaged the pressure-sensing valve 54 stands open so that the pressure generator is in direct communication with the brake motor via the fluid in the inner connecting lines and the fluid in chamber 35 and in the fluid link 36.

If the brake is released before there is any substantial wear on the linings or distortion of the brake members, valve 54 immediately snaps shut upon release of the hydraulic pressure to isolate the fluid link from the inlet fluid during the return stroke of the piston assembly 11. Moreover, as soon as the pressure of the pressure generator is released, the main spring 37 expands against the back pressure of the system to move the piston assembly 11 rightward to its position of engagement with annular shoulder 38 as in Fig. 1, and the brake retractor springs displace the fluid link from the brake motor into outlet chamber 36. The volume of fluid in the fluid link remains unchanged under these operating conditions.

If, however, during the period in which the brake is engaged there is noticeable wear occurring in the brake lining and/or expansion of the brake members, such conditions tend to relieve pressure in the fluid link. Therefore there then results an immediate corresponding flow of fluid from the inlet chamber 35 through ports 50–A and 50–B into the outlet chamber 36 to augment the volume of the fluid link until the full line pressure is restored in the fluid link. The volume of the fluid link is thus progressively increased in this manner and full braking force is maintained notwithstanding wear and/or expansion occurring during the braking operation. The fluid added to the fluid link through the ports 50–A and 50–B to compensate for such wear or expansion is trapped in the fluid link by the closing of the valve 54 as soon as the brake is released. Then when the floating piston assembly is retracted to its leftward position in Fig. 1, the added volume of fluid trapped in the fluid link operates to relocate the released position of the brake members relative to each other to maintain the desired predetermined release clearance.

In cases where the brake members undergo substantial thermal expansion or resilient deflection, the movable brake member such as the brake shoe, for example, may be adjusted by increasing the volume of the fluid link in the foregoing manner so that it will remain in firm engagement with the rotary brake member throughout the period the brake is applied, and thereafter when the brake is released, the brake shoe will be retracted the usual uniform distance from the drum. However, after the release the subsequent cooling of the brake members, or their elasticity will materially reduce this release clearance. Under some conditions the contraction or spring back will be of sufficient magnitude to lock the brake members. In the case of a drum brake, the drum may shrink to exert intense constricting force on the brake shoes.

In the event the brake members shrink enough to actually apply constricting force on the shoe in the system as shown in Figs. 1 and 2, such force will produce a corresponding increase in pressure in the fluid link. When the fluid link pressure reaches a predetermined valve, the pressure will act through port 50-B against the center portion of valve 54 to open valve 54. Then some of the fluid in the fluid link will bleed off through the ports 50-A and 50-B into the inlet chamber until the excess pressure in the fluid link is relieved and the brake members are merely in light dragging contact with each other. These events occur while the piston assembly is in its rightward position as in Fig. 1. The flow through the ports 50-A and 50-B toward chamber 35 under the conditions will continue until the pressure is equalized in the outlet and inlet chambers.

It is therefore impossible for a brake equipped with this mechanism to become locked thru "over adjustment," the worst case being merely that the shoes will drag lightly against the opposing braking members such as the brake drum.

Whether the shrinkage or spring back of the brake members after release merely brings about a slight reduction in the release clearance, or whether it is such as to result in a constricting force on the brake shoe to force open valve 54 as described in the next preceding paragraph, the desired release clearance between the braking members may be automatically restored by merely depressing the brake pedal momentarily after the brake members have cooled to ambient temperature and resume their normal location.

When the brake pedal is depressed to reset the release clearance, the piston assembly 11 is displaced forwardly toward the bottom 22 of the casing until the brake members are firmly engaged in the manner previously explained. However, since the release clearance existing when the pedal is depressed under these conditions is much less than the normal or preselected release clearance, the shoe will be firmly pressed against the brake drum substantially before the piston assembly 11 reaches its bottomed or actuated position as in Fig. 2. But as soon as the shoes are engaged, regardless of the particular axial position of the piston assembly 11 in the casing 12, the valve 54 may be forced open to communicate the ports 50-A and 50-B by the pressure of the inlet fluid acting against the peripheral marginal surface of the valve in the groove 47. Thereafter, although the pressure of the fluid acting against the opposing faces of the piston assembly 11 is balanced, since face 34 of the piston assembly directed toward the inlet chamber is of greater effective hydraulic area than the opposing surface, there will be a force acting on this face 34 greater than the counter force on the opposing side so that the piston assembly 11 is moved translationally leftward through the fluid link until the piston 26 is bottomed in the casing 12 as shown in Fig. 2. During this movement the volume of fluid in the fluid link is reduced by the amount of fluid spilling backward through ports 50-A and 50-B. Thereafter, as soon as the pedal or pressure generator is released, valve 54 instantly snaps shut and the main spring 37 expands to retract the piston assembly rightward to its Fig. 1 position and thus the desired release clearance between the braking members is restored.

In view of the foregoing explanation of the mechanism, it may be noted that within the range of operation of the motor of the brake, the brake may be brought into engagement with the opposing braking member no matter how much expansion or "fading" occurs in the braking members. By the same token the brake is automatically restored to accurate adjusted condition following a severe braking application by merely depressing the brake pedal momentarily. Inasmuch as valve 54 may be forced open by predetermined pressure in the fluid link, it is not possible to have the brake become locked as a result of subsequent shrinkage of the drum following an over-adjustment of the brake.

It may be noted that the pressure-sensing valve 54 is operative to open in response to either a predetermined pressure in the inlet chamber 35 or a predetermined pressure of fluid in the outlet chamber 36 sufficient to overcome valve spring 56.

In the event of failure of either of the main seals 31 or 32, about piston 32 the hydraulic fluid will leak into empty chamber 42 and there will be a resulting leakage through the vent 43 externally of the casing so that the leak may be visually noted. Similarly, if the seal 55 about the pressure-sensing valve 54 leaks, there will be a resulting flow of oil around the piston 54 into chamber 42, and this in turn will leak out through the vent 43 to provide a visual indication.

The adjuster mechanism further includes a conventional form of bleeder screw 60 located in a boss 61 communicating with the outlet chamber 36 as shown in Figs. 1 and 2.

The adjuster mechanism 70 shown in Fig. 3 embodies the same essential combination of parts and has the same mode of operation as that shown in Figs. 1 and 2. The Fig. 3 species differs, however, in specific details of construction.

In the adjuster mechanism 70 of Fig. 3 a cylinder 71 in which a piston valve 72 (corresponding to piston valve 54 in Fig. 1) is slidable, is located axially of the servo piston assembly 73 rather than radially as in Fig. 1. The cylinder 71 is closed by a plug 74 threaded into its end portion near the inlet chamber 75 and the space 76 inside the cylinder 71 is vented to an empty chamber 77 surrounding the waist of the piston assembly thru a passage 78. The latter chamber 77 is in turn vented by a strainer unit 80 through the wall of the outer casing 79 in which piston assembly 73 is slidable. The piston valve 72 regulates flow of fluid between a port 81 opening into the front end of the cylinder 71 and a passage 82 opening into a groove 83 surrounding a valve seat 84 for the piston valve 72.

Inside the tubular projecting portion 86 of the piston assembly in Fig. 3 there is a plug member 87 coaxial with the main spring 88, the plug providing an annular space in which the main spring may be stacked when it is compressed as the piston assembly is moved leftward to its actuated position. The plug member 87 in its actuated position is adapted to abut an outlet opening 90 of the mechanism so that a passage 91 through the center of the plug is aligned coaxially with port 81 and the outlet opening 90. Accordingly, when fluid flows from the inlet chamber through the passage 82 through port 81, it then flows through the passage 91 directly through the outlet opening 90. This construction advantageously avoids substantial reduction in the flow velocity of the fluid as it flows through the adjusting mechanism to the outlet opening 90 and results in a prompt supply of fluid to the fluid link when wear occurs.

In other respects the valve mechanism of Fig. 3 is the same as that of Figs. 1 and 2.

Variations in the constructions disclosed may be made within the scope of the appended claims.

I claim:

1. Hydraulic adjusting mechanism comprising a casing member, an actuated member movable in said casing member in sealing engagement with the interior of the casing member and defining with said casing member a first chamber to receive fluid for actuating said actuated member and a second chamber to contain fluid displaceable by the actuated member, spring means biasing said actuated member in a direction opposite to the displacing force on said actuated member by the fluid of said first chamber, said means being adapted to oppose displacement of said actuated member by the static back pressure of the fluid in said first chamber when the mechanism is in a non-actuated condition, a port connecting said chambers, and valve means for said port including means biasing said valve means toward a position to close said port and said valve means being operable in response to a predetermined pressure in said second chamber, and said valve means having an effective actuating surface responsive to a predetermined pressure of the fluid in said first chamber when the port is closed and in any position of the actuated member relative to said casing member to open said valve means, and said actuated member having an effective surface area exposed to fluid in said first chamber larger than the opposing surface area thereof exposed to fluid in said second chamber whereby said actuated member is operable while said port is open and said fluid in the first chamber is at actuating pressure to displace said actuated member in the casing and provide for flow of fluid through said port from said second chamber toward said first chamber.

2. A back-pressure resisting hydraulic adjusting mechanism for a brake system and the like, said mechanism comprising a casing, a piston therein having a forward face adapted to communicate with fluid forming a fluid link with a fluid motor and said piston having an opposing rearward face of greater effective hydraulic area than said forward face, said rearward face being adapted to communicate with actuating fluid from a fluid pressure generator, a spring in said casing exerting force on said piston in opposition to the force exerted on said piston by the static back pressure of the fluid generator when the mechanism is in a non-actuated condition to isolate said fluid link from the back pressure of the fluid generator, said spring force being adapted to be overcome and said piston displaced thereagainst when said mechanism is actuated, and valve means in said piston operable when the piston is at any axial position relative to said casing to open in response to a predetermined pressure (in excess of said back-pressure) in either said fluid link or in said actuating fluid to communicate said fluid link and said actuating fluid and regulate the volume of said fluid link to compensate for wear and/or deflection of the brake equipment associated with the mechanism.

3. Hydraulic adjusting mechanism comprising a casing having a first bore therein adapted to contain fluid forming a fluid link with a fluid motor with which the mechanism is associated and said casing having a second bore therein adapted to communicate with actuating fluid from a fluid pressure generator, a piston having a portion in sealing engagement with said first bore and another portion in sealing engagement with said second bore, said latter portion having an effective hydraulic area larger than the effective hydraulic area of the portion of the piston in said first bore, a chamber in said casing intermediate said portions of the piston void of hydraulic fluid and vented to the ambient atmosphere external of the casing, a spring in said casing biasing said piston in opposition to the force exerted on said piston by a predetermined static back pressure of the fluid generator when the mechanism is in a non-actuated condition to isolate said fluid link from the back pressure of the fluid generator, said spring being adapted to be overcome and said piston displaced thereagainst when said mechanism is actuated, a port through said piston connecting said first bore with said second bore, a cylinder in said piston into which said port opens adjacent one end of the cylinder, a valve seat at a mouth of said port in said cylinder, valve means for engaging said valve seat to close said port, said valve means including a valve piston slidable in said cylinder and a valve spring biasing said valve piston toward a closed position on said valve seat, said valve means being operable in response to a predetermined pressure of fluid in either of said bores of said casing to open said valve, and a passage connecting the region in said cylinder in which said piston valve is slidable with said atmospheric vented chamber in said casing to drain said cylinder of fluid leaking around said piston valve.

4. Mechanism in accordance with claim 3 in which said portion of the piston in said first bore is axially hollow to receive one end of said back-pressure spring, an outlet end in said casing against which the opposite end of said spring is positioned, a plug disposed inside said spring and including a passage axial with said piston port, said passage and said port and an outlet opening in said casing being aligned to conduct fluid into said fluid link from said second bore of the casing when said mechanism is in actuated condition and said valve is open.

References Cited in the file of this patent

UNITED STATES PATENTS

| 2,340,113 | Dodge | Jan. 25, 1944 |
| 2,381,930 | Schnell | Aug. 14, 1945 |
| 2,410,132 | Smisko | Oct. 29, 1946 |
| 2,488,433 | Porter | Nov. 15, 1949 |
| 2,513,015 | Fike | June 27, 1950 |

FOREIGN PATENTS

| 711,336 | Great Britain | June 30, 1954 |